United States Patent
Bensur

(10) Patent No.: US 6,846,532 B1
(45) Date of Patent: Jan. 25, 2005

(54) LAMINATE PACKAGING MATERIAL

(75) Inventor: Francis J. Bensur, Noblesville, IN (US)

(73) Assignee: Sonoco Development, Inc., Hartsville, SC (US)

( * ) Notice: Subject to any disclaimer, the term of this patent is extended or adjusted under 35 U.S.C. 154(b) by 7 days.

(21) Appl. No.: 09/783,795

(22) Filed: Feb. 15, 2001

(51) Int. Cl.$^7$ ................................................ C08K 3/34
(52) U.S. Cl. .................. 428/35.4; 428/36.7; 428/423.5; 428/423.7; 428/424.8
(58) Field of Search ............................ 428/35.4, 36.7, 428/423.3, 423.7, 424.8, 423.5

(56) References Cited

U.S. PATENT DOCUMENTS

| | | | |
|---|---|---|---|
| 2,531,396 A | 11/1950 | Carter et al. ................ 260/41.5 |
| 2,886,550 A | 5/1959 | Goren ........................ 260/33.6 |
| 3,170,833 A | 2/1965 | Noyes ........................ 161/186 |
| 3,753,761 A | 8/1973 | Sugahara et al. .......... 117/36.2 |
| 4,173,480 A | 11/1979 | Woodward ................... 430/536 |
| 4,220,490 A | 9/1980 | Carlson ....................... 156/257 |
| 4,242,488 A | 12/1980 | Stanley et al. ........... 428/423.1 |
| 4,352,858 A | 10/1982 | Stanley ..................... 428/423.1 |
| 4,374,939 A | 2/1983 | Van Fisk, Jr. et al. ...... 523/139 |
| 4,618,528 A | 10/1986 | Sacks et al. ................. 428/216 |
| 4,653,640 A | 3/1987 | Akao .......................... 206/455 |
| 4,659,785 A | 4/1987 | Nagano et al. ............. 525/324 |
| 4,725,466 A | 2/1988 | Crass et al. .................... 428/35 |
| 4,739,007 A | 4/1988 | Okada et al. ................ 524/789 |
| 4,786,558 A | 11/1988 | Sumiya et al. .............. 428/454 |
| 4,803,035 A | 2/1989 | Kresge et al. ............... 264/519 |
| 4,868,152 A | 9/1989 | Foulds et al. ............... 503/212 |
| 4,874,728 A | 10/1989 | Eilliott et al. ............... 501/148 |
| 4,889,885 A | 12/1989 | Usuki et al. ................. 524/445 |
| 4,903,841 A | * 2/1990 | Ohsima et al. ............. 206/604 |
| 4,906,517 A | 3/1990 | Akao et al. .................. 428/216 |
| 5,008,139 A | 4/1991 | Ochi et al. .................... 428/40 |
| 5,041,330 A | 8/1991 | Heerten et al. ............. 428/213 |
| 5,091,462 A | 2/1992 | Fukui et al. ................. 524/504 |
| 5,102,948 A | 4/1992 | Deguchi et al. ............ 524/789 |
| 5,190,997 A | 3/1993 | Lindemann et al. .......... 524/44 |
| 5,221,568 A | 6/1993 | Heerten et al. ............. 428/213 |
| 5,387,449 A | * 2/1995 | Kunz et al. ................. 428/35.4 |
| 5,421,876 A | * 6/1995 | Janoski ....................... 106/278 |
| 5,436,073 A | 7/1995 | Williams et al. ............ 428/343 |
| 5,486,408 A | * 1/1996 | Sentendrey ................. 428/220 |
| 5,506,310 A | 4/1996 | Vasselin et al. ............. 525/426 |
| 5,523,338 A | 6/1996 | McCarthy et al. .......... 523/466 |
| 5,527,616 A | 6/1996 | Hatano et al. ............ 428/423.1 |
| 5,571,614 A | 11/1996 | Harrison et al. ............ 428/331 |
| 5,580,630 A | 12/1996 | Byrd ........................... 428/47 |
| 5,585,129 A | 12/1996 | Geddes et al. .............. 426/394 |

(List continued on next page.)

FOREIGN PATENT DOCUMENTS

| | | |
|---|---|---|
| EP | 0 349 838 | 1/1990 |
| EP | 0 622 437 | 11/1994 |
| EP | 0 822 207 | 2/1998 |
| WO | 00/78540 | 12/2000 |

*Primary Examiner*—Sandra M. Nolan
(74) *Attorney, Agent, or Firm*—Drinker Biddle & Reath LLP

(57) ABSTRACT

A laminate packaging material for use with food products, and a retortable pouch comprising that material, are disclosed. The laminate material includes an outer polyethylene terephthalate layer, a nylon second layer, and a polypropylene inner layer. A solventless adhesive is used to bond the layers together. The solventless adhesive includes surface-modified exfoliated montmorillonite clay platelets. The platelets lie generally parallel to the plane of the laminate, and overlap to form a barrier to oxygen and other volatile materials. The retortable pouch is formed by heat sealing the edges one of more sheets of the laminate such that the polypropylene layers face inward and are welded together. The pouch and its contents can then be pasteurized by heat-treatment without degradation of the laminate or the heat seal.

24 Claims, 3 Drawing Sheets

U.S. PATENT DOCUMENTS

| | | | |
|---|---|---|---|
| 5,654,085 A | 8/1997 | Markusch et al. | 428/221 |
| 5,662,983 A | 9/1997 | Stark | 428/117 |
| 5,667,886 A | 9/1997 | Gough et al. | 428/331 |
| 5,670,226 A | 9/1997 | Yoshizawa et al. | 428/40.1 |
| 5,747,560 A | 5/1998 | Christiani et al. | 523/209 |
| 5,763,028 A | 6/1998 | Matsumoto et al. | 428/34.7 |
| 5,772,819 A | 6/1998 | Olvey | 156/82 |
| 5,804,613 A | 9/1998 | Beall et al. | 523/200 |
| 5,919,547 A | 7/1999 | Kocher et al. | 428/138 |
| 5,989,696 A | 11/1999 | McCarthy et al. | 428/288 |
| 5,997,732 A | 12/1999 | Yenni et al. | 208/307 |
| 6,013,340 A * | 1/2000 | Bonk et al. | 428/35.2 |
| 6,013,363 A | 1/2000 | Takahashi et al. | 428/315.9 |
| 6,025,058 A | 2/2000 | Shepherd | 428/215 |
| 6,051,193 A | 4/2000 | Langer et al. | 422/179 |
| 6,407,155 B1 * | 6/2002 | Qian et al. | 524/445 |

* cited by examiner

LAMINATE PACKAGING MATERIAL

FIELD OF THE INVENTION

The invention relates to a laminate material for packaging, and especially to a material that can be formed into a flexible container or retortable flexible pouch that can be sealed and then heated to a temperature sufficient to pasteurize or sterilize its contents.

BACKGROUND OF THE INVENTION

In order to extend the shelf life of a food product, bacteria within the food must be eliminated. One common method for eliminating harmful bacteria in food products is by heating the food products to a temperature sufficient to kill the bacteria. For many years, food products were first sealed within metal cans and then the canned food was heated to a suitable temperature. After cooling, the canned food could be stored at room temperature for long periods of time.

Recently, metal cans have been replaced by flexible pouches called retort pouches. These pouches come in a variety of shapes and sizes. The two most common forms are described as flat or pillow shaped and gusset or stand-up shaped pouches. These pouches are considerably lighter and lower cost than metal cans, and are considered as a source of reduction when placed into the public waste stream. The typical flat or pillow pouch consists of one or two sheets of laminated material. The typical gusset or stand-up pouch is manufactured by using three sheets of laminated material. Both types are sealed together by heat-sealing after filling. This process can be accomplished by using pre-made pouches, filling and sealing out of line, or by form, fill, and seal inline.

In order to be used in a retort process, the flexible pouch must comply with a number of requirements. The U.S. government Food and Drug Administration (FDA) is very specific as to the materials which can and cannot be used for flexible packages that will be subjected to temperatures over 250° F. Specifically, 21 C.F.R. § 177.1390 regulates the chemical components that can be used to construct a flexible pouch that will be subjected to these extreme temperature environments. The physical properties of these flexible pouches: lamination bond strengths, heat seal strengths, WVTR (water vapor transmission rates), OTR (oxygen transmission rates), and burst analysis exceed normal testing parameters, but the liquid components used to adhere the films together, along with the films themselves, must comply with migratory testing guidelines established by the FDA.

The components that make up the pouch (ink, adhesive, films, and solvents) must not contain mobile components that might contaminate the contents, and include a functional barrier that prevents the passage of mobile substances (gases or volatile liquids) from outside the pouch. Any liquid, that is to say, in this case the adhesive, that is used inside of the functional barrier must be subjected to migration testing if the chemical nature of that adhesive is not made from an aliphatic isocyanate. The regulation is waived if the adhesive components are of an aliphatic nature. In such the adhesive is deemed FDA § 177.1390 compliant. The pouch still must remain airtight and bacteria-proof (hermetically sealed) after going through the normal retort process, which exposes the pouch to temperatures in the range of from 120° C. to 130° C. for 30 to 80 minutes at a pressure of 3.0 to 5.0 Bar. This temperature, pressure, and time may be varied slightly depending on the pouch size and the contents within the pouch.

One type of flexible retort pouch that is currently available is constructed of a four layer laminate with an outer layer of polyethylene terephthalate (PET), a metal foil layer, a polyamide layer, followed by an inner layer of cast polypropylene (CPP). The layers of such prior art packages are held together by urethane adhesives that contain methyl ethyl ketone, ethyl acetate, or acetone as solvents. Until recently, solvent based adhesives were the only type that could be used to manufacture retortable structures.

Solventless adhesives for retort applications have been developed only in the last two years. These solventless adhesives are defined as a two-component urethane system in which one component is isocyanate and the other component is polyol. The isocyanate part is aliphatic to meet the FDA guidelines for retortable materials. These components are low molecular weight in nature, and require no solvent for dispersion or application. When the two components are combined in the proper mix ratio, and applied on a solventless laminator at the proper coating weight and temperature, and with the proper cure time, the end result is a crosslinked polyester urethane film that adheres the adjacent layers together within a retort lamination.

The previously-used laminate described above requires four distinct layer materials, three adhesive coatings, and three laminating operations, requiring either complex and expensive multi-layer laminating machine or a complex succession of operations. As a result, the cost of manufacturing such a material is significant. However, in a multi-layer laminate, each layer has a definite purpose. For example, PET provides an abrasion-resistant, printable outer surface. Nylon provides structural strength to the film. Metal foil provides impermeability to gases and, in particular, prevents oxygen from penetrating the contents of the package and thus increases the shelf life of many products. Cast polypropylene provides a heat-sealable inner surface that can be welded to itself to form an airtight package, with a softening temperature low enough to be sealed without damaging the contents, or the laminate structure, but high enough to survive the retorting of the sealed package. Thus, the laminate structure cannot be simplified merely by eliminating layers.

SUMMARY OF THE INVENTION

The present invention relates to the manufacturing of improved laminates.

One embodiment of the invention is a three layer laminate including an outer polyester layer, a polyamide second layer, and a polypropylene inner layer. The layers are bonded together with adhesives. One or both of the adhesive coats contains clay platelets.

In the thin adhesive layer, the platelets tend to lie parallel to the general plane of the laminate. In sufficient concentration, the clay platelets overlap and overlie one another to form a functional barrier layer, substantially reducing the permeability of the laminate to gases and volatile substances. By including the clay in an adhesive bonding two of the layers of the laminate together, the separate foil layer can be eliminated. With only three distinct layers instead of four, and two laminated adhesive bonds instead of three, a considerable reduction in material costs and cost of fabrication is possible.

Another embodiment of the invention is a two-layer laminate including an outer polyester layer and a polypropylene inner layer. The layers are bonded together with adhesive. The adhesive coat contains clay platelets.

Preferably, the adhesive is a solventless adhesive formed of an aliphatic isocyanate and a diol, and contains from 0.75% to 1.5% by weight of surface-modified exfoliated montmorillonite clay.

Another embodiment of the invention is a retortable pouch constructed from a two-layer or three-layer laminate according to the invention.

The foregoing and other features and advantages of the present invention will become more apparent in light of the following detailed description of the preferred embodiments thereof, as illustrated in the accompanying figures.

DETAILED DESCRIPTIONS OF THE DRAWINGS

Figure 1:
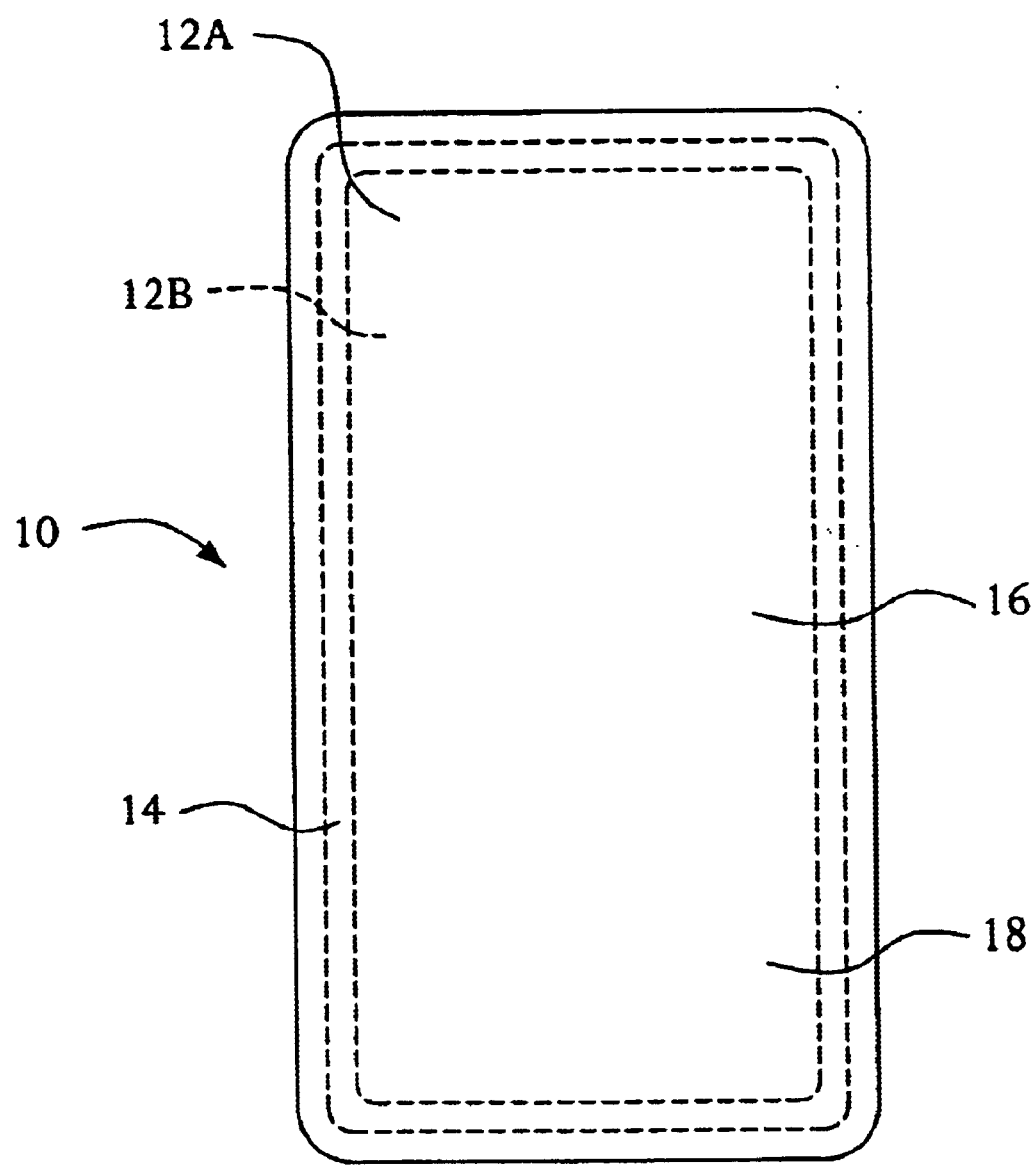
FIG. 1 is a plan view of a pillow retortable pouch according to the present invention.

Referring to the drawings, and initially to FIG. 1, one form of pillow or flat retortable pouch according to the present invention is shown and indicated generally by the reference numeral 10. The pillow pouch 10 includes two sheets 12A and 12B of laminated material, joined and sealed together about their respective edges by a heat seal 14. A storage space 16 is defined by the area between the two sheets 12A, 12B and within the heat seal 14. The storage space is sealed off from the surrounding environment and contains the contents 18 of the pouch, which may be, for example, foodstuffs. The sheets 12A, 12B can be formed in a suitable shape desired for containing the food product. For example, one of the sheets 12B may be formed into a dish shape, with a planar flange. The second sheet 12A can then be heat sealed to the flange of the first sheet 12B.

While the package is described as having two sheets 12A, 12B, it should be readily apparent to those skilled in the art that a single sheet could be used. The sheet could be folded upon itself to form the two layers. The three unconnected edges would then be heat sealed after the contents are placed between the folded-over layers.

Figure 2:
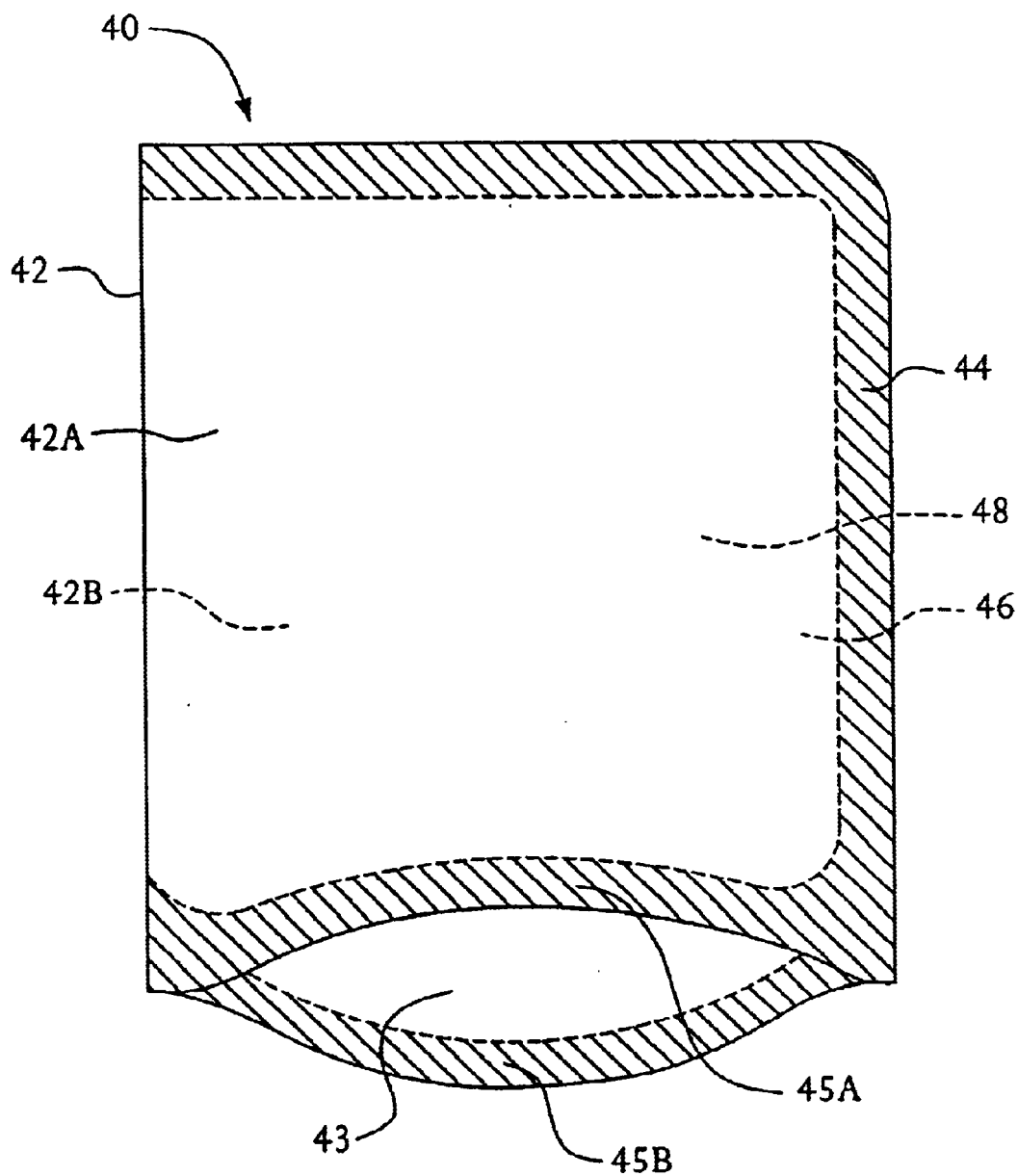
FIG. 2 is an oblique view of a stand-up retortable pouch according to the present invention.

Referring now to FIG. 2, one form of gusset or stand-up retortable pouch is indicated generally by the reference numeral 40. The gusset pouch 40 includes two sheets of laminated material 42 and 43. One sheet 42 is folded to form the front and back sheets 42A and 42B of the pouch. The sheets are joined and sealed together about their respective edges by a heat seal 44 round the sides and top, and heat seals 45A, 45B in the bottom gusset. A storage space 46 is defined by the area between the three sheets 42A, 42B, 43 and within the heat seals 44, 45A, 45B. The storage space is sealed off from the surrounding environment and contains the contents 48 of the pouch. The sheets 42A, 42B, 43 can be formed in any suitable shape desired for containing the food products. Normally, two webs of laminated material are fed into a pouch machine. A main web forms the sheet 42, and is folded in half along one side of the pouch to form the front sheet 42A and the back sheet 42B, which are aligned one on top of the other. The free edges of the sheets 42A and 42B are heat sealed together by the heat seal 44 along the other side of the pouch. The second web is fed into the side of the machine to form the bottom gusset sheet 43, and is heat sealed to the front and back sheets 42A and 42B to form an open-topped pouch. The pouch can now be stored for later filling, or can go directly on-line into the filling machinery. After the contents have been placed within the pouch, the top edges of the front and back sheets 42A and 42B are sealed together by a final heat seal 44.

While the package is described as having two sheets 42 and 43, it should be readily apparent to those skilled in the art that three sheets could be used, with the front 42A and rear 42B being formed from separate webs of material, heat-sealed together along both sides. It will also be apparent that a single sheet could be utilized. The sheet could be folded upon itself to form the three sheets. Typically, the middle of the single sheet would form the gusset 43, and the ends would meet at the top of the pouch. The unconnected side and top edges would then be heat sealed, at least one of them being sealed only after the contents are placed between the folded-over layers.

Figure 3:
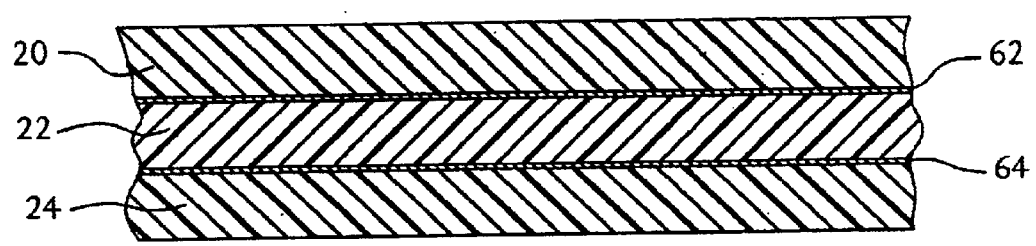
FIG. 3 is a cross-section through one sheet of a three-layer retortable pouch shown in FIG. 1.

The sheets 12A, 12B of the pillow retortable pouch 10 can be manufactured from a 3-layer laminated structure as shown in FIG. 3. The sheets 42A, 42B, 43 of the stand-up pouch 40 can likewise be formed from that structure.

Referring now to FIG. 3, the 3-layer laminate includes three layers. The outermost layer 20, away from the package contents 18 or 48, is made from polyester. In the preferred embodiment, the layer 20 is polyethylene terephthalate, preferably about 9 to 12 microns in thickness. The second layer 22, which is immediately adjacent to the outer layer 20, is a nylon layer having a preferred thickness of 14 to 25 microns. The innermost layer 24 is made from cast polypropylene and has a preferred thickness of 55 to 110 microns.

All layers in the retortable package are bonded together by solventless adhesive. Solventless adhesives based on two component materials that have the chemical composition of a polyol and an isocyanate are suitable. Both of these components can be based on chemicals that are low enough in molecular weight to be applied to the films without needing solvents for dilution and application. The chemical constituents are still found to be 21 C.F.R. § 177.1390 and § 175.105 approved where needed within the package.

The PET and nylon layers 20 and 22 are bonded together by an adhesive layer 60, which is preferably Tycel 7990/6092, manufactured and sold by the Liofol Company, and applied at a coating weight of 1.2 to 1.5 lbs per 3000 sq. ft. From 5% to 10% by weight of montmorillonite, preferably in the form of NANOMER 1.28E or 1.30E nanoclay supplied by Nanocor, Inc., is added to the Tycel 6092, which is an —OH terminated prepolymer, before the adhesive is mixed. The Tycel 7990 aliphatic isocyanate prepolymer and the Tycel 6092 are preferably mixed together in a ratio of 15:1 to 6:1, so as to give a concentration of 0.75% to 1.5% of nanoclay platelets in the mixed adhesive. The adhesive is applied to the PET layer, and the nylon layer is laminated onto it. The laminate is then cured for two days. After curing, the nylon layer 22 and the cast polypropylene layer 24 are bonded together by an adhesive layer 64, which is preferably also Tycel 7990/6092 with nanoclay platelets, and applied at a coating weight of 1.2 to 1.5 lbs per 3000 sq ft. The adhesive layer 64 is applied to the back of the nylon layer 22, which is then laminated to the CPP layer 24.

The Tycel 7990/6092 adhesive is a solventless adhesive that has been recently been approved by the FDA for use in food packaging under 21 C.F.R. § 177.1390. The retortable package described above is designed to withstand the anticipated applied temperatures in the range of 120° C. to 130° C. (250° F. to 265° F.) for 30 to 80 minutes without degradation. These are the temperatures and times typically needed to eliminate bacteria from food in a retort pouch.

The NANOMER nanoclay is a montmorillonite clay, exfoliated into minute platelets. The platelets are of the order of 1 nm thick and 1 μm across. The montmorillonite has a theoretical formula of:

$$M_y^+(Al_{2-y}Mg_y)Si_4O_{10}(OH)_2 \cdot nH_2O$$

However, in the natural state some central Al and Mg ions are substituted by lower-valency ions. The substitution creates a negative charge imbalance, which is compensated by adsorbing hydratable cations, especially sodium. The NANOMER nanoclay is surface modified to substitute quaternary onium ions for some of the adsorbed sodium ions. The substitution reduces the adhesion between platelets, and makes it possible to disperse the platelets in the adhesive.

Somewhat surprisingly, it has been found that a suitable blend of nanoclay and solventless urethane adhesive forms a barrier layer of overlapping nanoclay platelets sufficiently impenetrable to provide a useful barrier layer in a packaging film, preventing the penetration of oxygen and other undesirable volatile substances, while still providing an adhesive layer strong enough to bond together the film layers of the laminate.

Figure 4:
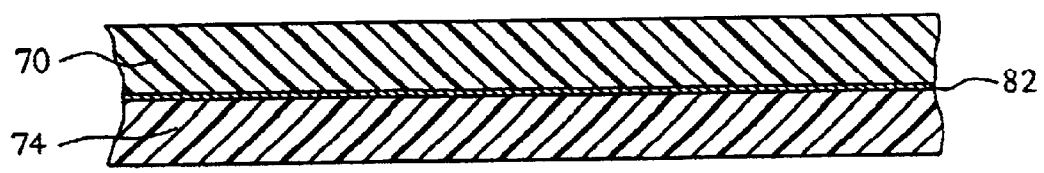
FIG. 4 is a cross-section through one sheet of a two-layer retortable pouch shown in FIG. 1.

Referring now to FIG. 4, the 2-layer laminate includes two layers. The outer layer 70, away from the package contents 18 or 48, is made from polyester.

In the preferred embodiment, the layer 70 is polyethylene terephthalate, preferably about 9 to 12 microns in thickness. The inner layer 24 is made from cast polypropylene and has a preferred thickness of 55 to 10 microns. The two layers are bonded together by an adhesive layer 82, which has the same composition as the adhesive layers 62 and 64 shown in FIG. 3.

In either type of retortable pouch, the pillow pouch shown in FIG. 1 or the stand-up pouch shown in FIG. 2, specific ink systems can be used to reverse print the polyester layer before lamination. This is an option that may be selected by the end user depending on what markets the end product is intended to be supplied in, and is not essential to the invention in its broadest sense. Because the ink is outside the montmorillonite functional barrier, it may be possible to use inks that would not be acceptable in direct contact with the contents of the pouch, to the extent that the montmorillonite functional barrier prevents migration of ink components through the laminate. The presence of the nanoclay in the adhesive gives the laminate a slightly hazy appearance, which may need to be taken into account when designing the appearance of the printed package.

Although the invention has been described and illustrated with respect to exemplary embodiments thereof, it should be understood by those skilled in the art that the foregoing and various other changes, omissions, and additions may be made therein and thereto, without parting from the spirit and scope of the present invention.

What is claimed is:

1. A pouch having at least one sheet comprising a laminate comprising:
   a polyester outer layer;
   a polypropylene inner layer; and
   a first solventless aliphatic polyurethane laminating adhesive applied to at least one layer of an adjacent pair of layers of said laminate to bond together said adjacent layers of said laminate, said laminating adhesive including exfoliated clay platelets forming a functional barrier to the passage of gases through the at least one sheet; and
   the pouch including a storage space substantially enclosed by said at least one sheet.

2. A pouch according to claim 1, further comprising: a polyamide layer between said polyester outer layer and said polypropylene inner layer and bonded to one of said polyester outer layer and said polypropylene inner layer by said first adhesive; and a second adhesive bonding said polyamide layer to the other of said polyester outer layer and said polypropylene inner layer.

3. A pouch according to claim 2, wherein said second adhesive is the same as said first adhesive.

4. A pouch according to claim 2, wherein said polyamide layer is made of nylon.

5. A pouch according to claim 1, wherein said polyester layer is made of polyethylene terephthalate.

6. A pouch according to claim 1, wherein said polypropylene layer is cast polypropylene.

7. A pouch according to claim 1, which is capable of being retorted at a temperature of at least 120° C. without damage.

8. A pouch according to claim 1 wherein the pouch has at least one seam, which joins edges of two portions of the laminate, which edges lie face to face with the said polypropylene layers of the two portions of the laminate facing one another.

9. A pouch according to claim 8, wherein the polypropylene layers of the two laminate portions are joined by welding and wherein the bonding of adjacent layers within the laminate portions is not effected by the welding of the polypropylene.

10. A pouch according to claim 1, wherein said first adhesive comprises an aliphatic diisocyanate and a diol.

11. A pouch according to claim 1, wherein said exfoliated clay platelets comprises montmorillonite clay platelets surface-modified by replacing sodium ions with quaternary onium ions.

12. A pouch according to claim 1, wherein the storage space contains a product, and the at least one sheet is sealed so as to substantially inhibit the ingress of bacteria into the storage space.

13. A laminated material for use in a retortable pouch, the laminated material comprising:
   a polyester first layer;
   a polyamide second layer adhesively attached to the first layer by a first solventless laminating adhesive applied to at least one of the first and second layers, the laminating adhesive including clay platelets; and
   a polypropylene third layer attached to the second layer with a second solventless adhesive.

14. A material according to claim 13, wherein the first solventless adhesive and the second solventless adhesive are the same.

15. A material according to claim 13, wherein the second solventless adhesive includes clay platelets.

16. A material according to claim 13, wherein the said polyester is polyethylene terephthalate.

17. A material according to claim 13, wherein the said polyamide is nylon.

18. A material according to claim 13, wherein the said polypropylene is cast polypropylene.

19. A material according to claim 13, wherein the said clay platelets are surface-modified montmorillonite platelets.

20. A laminated material for use in a retortable pouch, the laminated material comprising:
   a polyester first layer; and
   a polypropylene second layer adhesively attached to the first layer by a solventless laminating adhesive applied to at least one of the first and second layers, the laminating adhesive including clay platelets.

21. A material according to claim 20, wherein the said polyester is polyethylene terephthalate.

22. A material according to claim 20, wherein the said polypropylene is cast polypropylene.

23. A material according to claim 20, wherein the said clay platelets are surface-modified montmorillonite platelets.

24. A flexible laminate for a pouch, the laminate comprising:

a first layer comprising polyester film;

a second layer comprising polypropylene film;

a laminating adhesive applied to a surface defined by at least one of the first and second film layers to bond the first and second film layers together, the laminating adhesive comprising polyurethane and clay platelets.

* * * * *